L. J. WILSON.
TRAP.
APPLICATION FILED NOV. 28, 1919.
1,420,229.
Patented June 20, 1922.
2 SHEETS—SHEET 1.
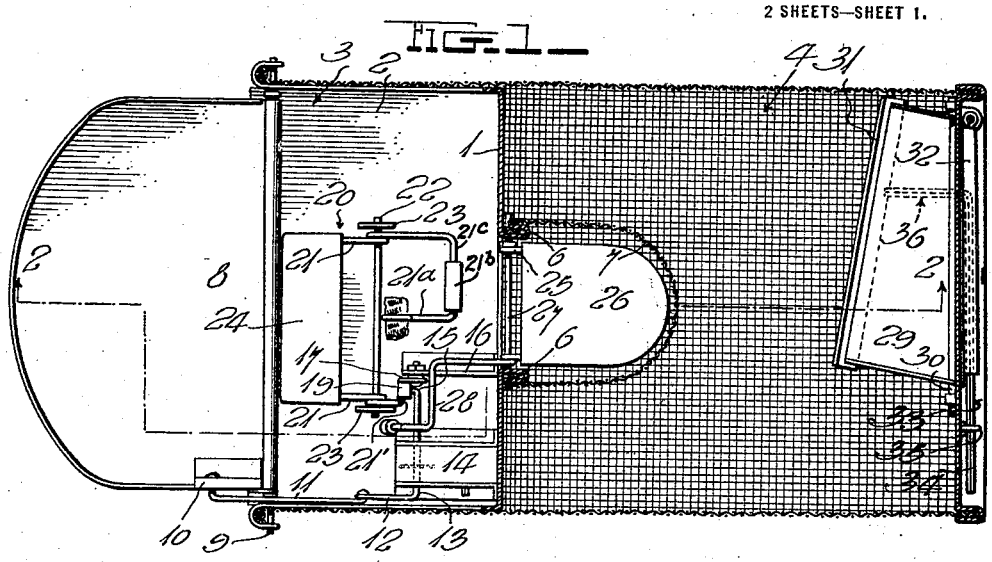
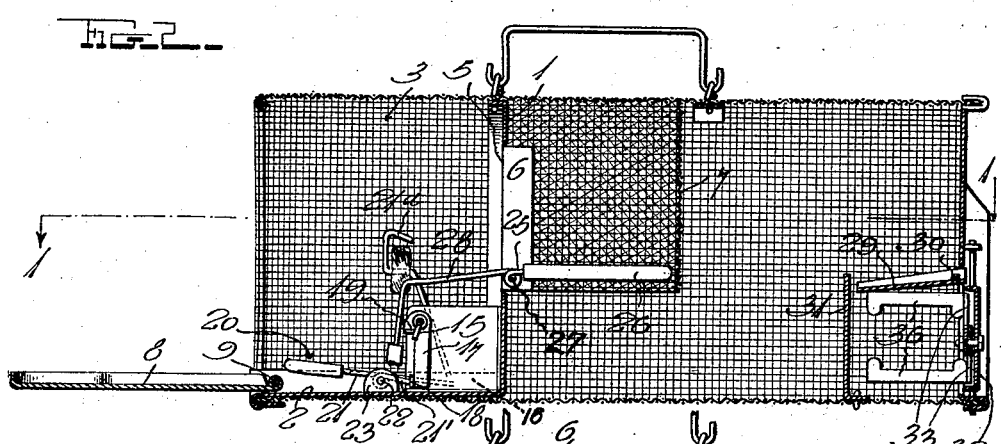
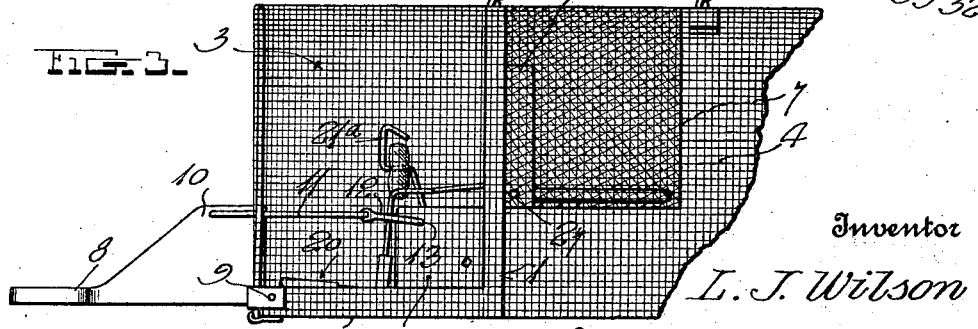
Inventor
L. J. Wilson
By
Attorneys L. J. WILSON.
TRAP.
APPLICATION FILED NOV. 28, 1919.
1,420,229.
Patented June 20, 1922.
2 SHEETS—SHEET 2.
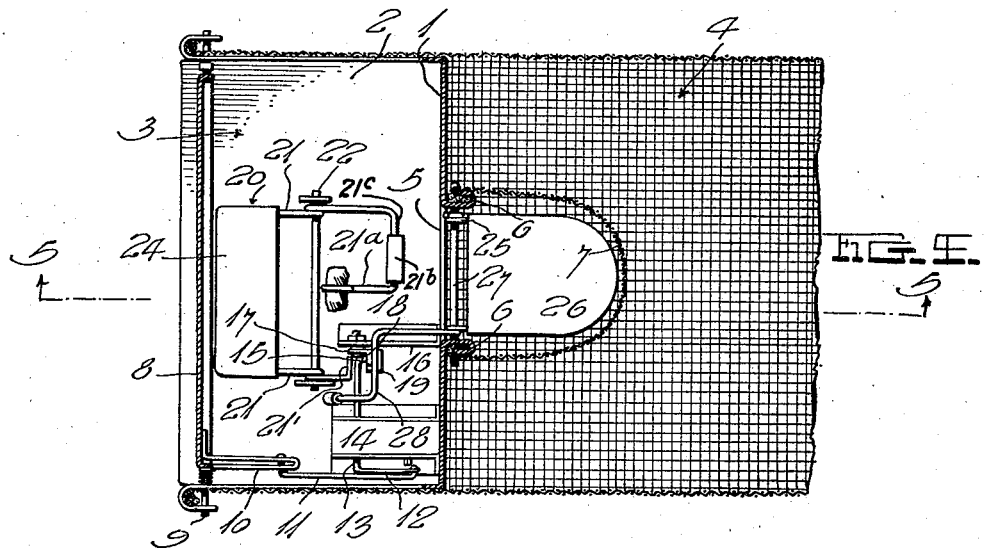
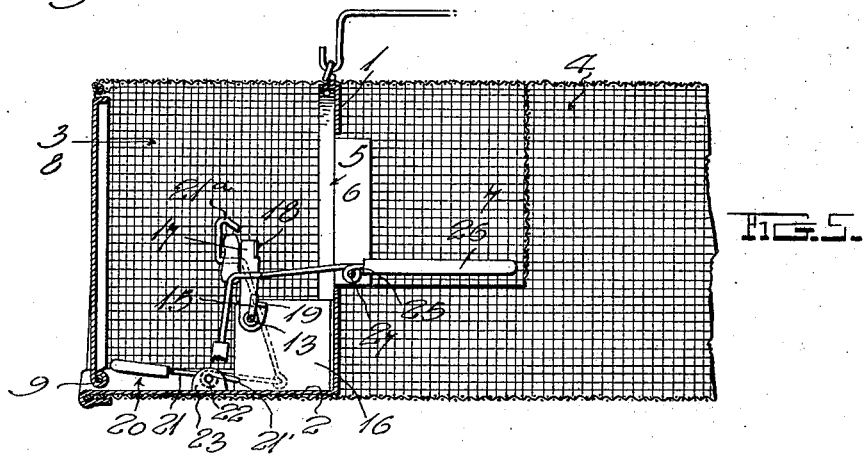
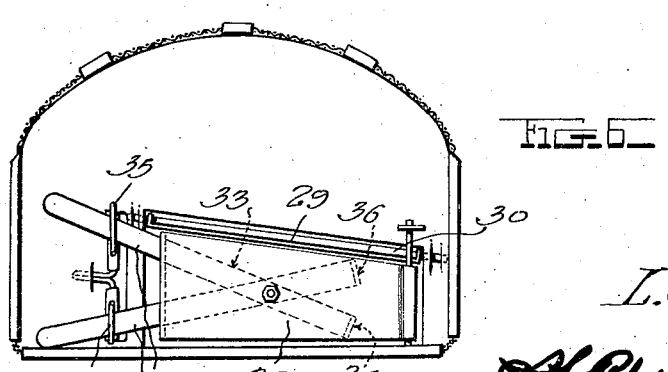
Inventor
L. J. Wilson
By H. B. Wilson & Co.
Attorneys

UNITED STATES PATENT OFFICE.

LORAN J. WILSON, OF JONESVILLE, VIRGINIA.

TRAP.

1,420,229.   Specification of Letters Patent.   Patented June 20, 1922.

Application filed November 28, 1919. Serial No. 341,125.

*To all whom it may concern:*

Be it known that I, LORAN J. WILSON, a citizen of the United States, residing at Jonesville, in the county of Lee and State of Virginia, have invented certain new and useful Improvements in Traps; and I do declare the following to be a full, clear, and exact description of the invention, such as will enable others skilled in the art to which it appertains to make and use the same.

This invention relates to improvements in traps and more particularly to traps adapted to be automatically reset by the trapped animal.

The principal object is to provide a simple and practical trap comprising a cage having two compartments, the partition between them being provided with an opening adapted to be closed by a treadle which is depressed by the animal entrapped to reset said trap.

With the above and other objects in view, the invention consists of certain novel features of construction and the combination and arrangement of parts as will be more fully described and claimed.

I attain the above objects by the mechanism illustrated in the accompanying drawing, in which—

Fig. 1, is a horizontal section taken on the line 1—1 of Fig. 2.

Fig. 2, is a section taken on the line 2—2 of Fig. 1, showing the door open;

Fig. 3, is a detail side elevation of the entrance end of the trap;

Fig. 4, is a horizontal section showing the door in closed position;

Fig. 5, is a section taken on the line 5—5 of Fig. 4; and

Fig. 6, is an end elevation showing the animal removing device.

Similar numerals of reference designate similar parts throughout the several views.

Reference is now had to the drawing in which is shown a cage of any suitable shape and dimensions though I preferably construct it in rectangular shape from screen wire. The cage is elongated and is divided into compartments by a vertical partition 1 formed of a sheet of metal or the like, said partition having its lower end portion bent right angularly to form a floor plate 2 for disposition in the compartment 3 of the trap. The compartment 3 is approximately one third the size of the other compartment 4 and is primarily adapted for housing the door operating mechanism. In order that an animal may pass from the first compartment 3 to the compartment 4 an opening 5 is provided, said opening being spaced above the floor and having the portions of the metal forming its vertical walls, bent longitudinally with respect to the cage to form flanges 6, said flanges then being folded upon themselves to secure the free ends of a substantially U-shaped wall 7 depending from the top of said cage and formed of a material similar to that of the cage. The forward end of the first compartment 3 is open and adapted to be closed by a sheet metal door 8 which has its edges bent to form flanges. The door is substantially arch-shaped and is hinged at its lower edge to the floor plate 2 by means of a shaft 9 which extends through a bead or sleeve at the lower end of the door and has its ends mounted in bearings formed in the flanges of the floor plate 2. One end 10 of the flange on the door is enlarged and is folded upon itself and has its end bent laterally for attachment to the door body, said end 10 being apertured for the reception of the hooked end of a rod 11 which coacts with the laterally bent end 12 of a shaft 13 to form a link connection between the door and motor.

A suitable spring motor 14 similar to that shown in my prior Patent No. 1,040,478, issued October 8th, 1912, is inclosed in a casing and mounted on the floor plate 2, one shaft 13 of said motor being extended beyond the sides of the motor casing and having one end bent laterally to form a stop finger 15 whose function will be hereinafter set forth.

Secured to the floor plate and partition is a vertically disposed bracket 16 in the upper outer corner of which is pivotally mounted an arm or detent 17, the pivotal point being horizontally alined with said shaft 13. The arm or detent 17 comprises a short strip of sheet metal, upon each end of which is formed a laterally extending ear or stop finger, the finger 18 on the outer end extending parallel with the detent, and the finger 19 on the inner end being disposed at right angles to said arm, said inner stop finger 19 being disposed at all times in contact with and in the path of travel of the finger 15 on the inner end of the motor shaft 13. Through this connection of parts it is seen that the detent will be rotated with the motor shaft when the motor is operating.

A treadle 20 is provided, said treadle comprising a substantially U-shaped frame formed from a single length of wire, the parallel arms 21 thereof being looped near their ends for the reception of a shaft 22 which extends transversely of the cage and has its ends mounted in apertured ears 23 rising from the floor plate 2. A floor plate 24 of metal or the like is secured to the arms 21 and the arm connecting bar. One of the arms 21 extends a short distance beyond the shaft 22 and is bent laterally to form a stop finger 21' normally disposed in the path of the stop finger 18 on the outer end of the detent. The other side arm 21 is extended to a point near the partition 1, at which point it is bent laterally toward the motor, then upwardly toward the door to form a bait support 21$^a$. The extreme upper end of said arm is bent longitudinally with respect to the cage, then upwardly and horizontally to form a suitable bait receiving portion on the bait support. A weight 21$^b$ is carried by the portion 21$^c$ of this arm and serves to normally retain the treadle in a position with the floor plate 24 raised and the finger 21' in position for engaging the finger 18.

A treadle is mounted in the partition opening, said treadle comprising a substantially U-shaped wire frame 25 carrying a metal plate 26 which serves to normally close the opening at the lower end of the depending wall 7. A shaft 27 has its ends mounted in openings formed adjacent the lower end of the flanges 6 formed on the vertical edges of said partition opening. One arm of the frame 25 is extended longitudinally above the bracket 16 to a point spaced vertically above the arm or detent 17 where it is bent laterally toward the motor forming a stop 28 for normally engaging the detent 17 when the motor is running. The end of the arm forming the stop 28 is bent longitudinally toward the door and then downwardly, the lower end being weighted to retain the treadle plate 26 in a horizontal position to prevent an animal from returning to the first compartment after having passed into the second one.

In operating this trap the door is moved to its open position as shown in Figs. 1 and 2, thereby horizontally alining the parts of the link connection between the door and motor as shown in Fig. 3. The treadle 20, due to the weight on its inner end, will be positioned as shown in Fig. 2, the stop formed on one of its arms being in contact with the stop finger 18, thereby preventing the motor from starting until said treadle is depressed. Depression of the treadle will release the detent, permitting the motor to start, and, through the aforesaid link connection, the door is closed as shown in Figs. 4 and 5. An animal caught in the first compartment will look for an opening, and will go through the partition opening into the next compartment. In doing this, the animal will depress the second treadle thereby disengaging the stop 28 from the detent, thereby reopening the door. The animal can not return to the first compartment after the door has been opened, since the weight on the second treadle contacts with the floor and prevents upward opening of the treadle.

For the purpose of permitting easy removal of trapped animals from the second compartment, an opening is formed in its end, said opening extending from one side to a point beyond the longitudinal center of the cage. The width of the opening increases from the end adjacent the side of the cage, for a purpose to be seen. A door 29 shaped to fit the opening is hinged at its upper edge to a shaft 30 whose ends are mounted in suitable bearings formed by slitting portions of the side walls of the opening. This door is adapted to swing inwardly and upwardly and have its outer edge positioned adjacent a sheet metal wall 31 which is secured to the cage bottom. This wall and door coact to form a darkened tunnel into which an animal will naturally attempt to hide.

Another door 32 shaped similarly to the first door, is hinged at its narrow end to the end wall of the opening and carries on its inner face a pair of crossed levers 33 whose outer ends 34 project a considerable distance beyond the free end of the door to serve as operating handles for the device and to lock the door in closed position. In locking the door closed the ends or handles 3 are separated or moved away from each other into keepers 35, said keepers being formed from a single length of wire folded upon itself at its center, the arms then being bent laterally in opposite directions and folded upon themselves as indicated in Fig. 6.

The inner ends of the levers are bent laterally inwardly to form a pair of animal gripping jaws 36, whose adjacent edges are notched as shown in Fig. 2. When the second door 32 is closed, these jaws push the first door inwardly to coact with the aforesaid wall to form a tunnel. The lever handles are then moved into the keepers to lock the door, thereby simultaneously opening the jaws so that an animal entering the tunnel will place his head between said jaws. When the animal is in this position, the handles may be pushed together to grasp the animal and be easily removed. As the animal is removed, the first door automatically closes, thereby preventing escape of other animals.

From the foregoing description taken in connection with the accompanying drawing, the construction and operation of the invention will be readily understood without requiring a more extended explanation.

Various changes in the form proportion and minor details of construction may be resorted to without departing from the principle or sacrificing any of the advantages of the claimed invention.

I claim:

1. A trap of the class described including an elongated cage having a vertical transverse partition to form two compartments, said partition having an opening therethrough, one compartment having an open outer end, a swinging door for closing said open end, a spring motor mounted in said open ended compartment, connecting means between said motor and door to permit opening and closing of the door by the motor, a shaft projecting inwardly from said motor, an arm operated by said shaft, means for stopping said motor when the door is in its open position, said means including a treadle, a stop finger carried by said treadle for disposition in the path of said arm, said treadle being depressible to release said arm for rotation, a second treadle, said second treadle being mounted in the partition opening and an arm carried by said second treadle, said arm being positioned to arrest rotation of said shaft operated arm when the door is closed and movable by depression of said second treadle to permit opening of said door by the motor.

2. A trap of the class described including an elongated cage having a vertical transverse partition to form two compartments, said partition having an opening therethrough, one compartment having an open outer end, a swinging door for closing said open end, a spring motor mounted in said open ended compartment, connecting means between said motor and door to permit opening or closing of the door by the motor, a shaft projecting inwardly from said motor, a bracket rising from the floor of said compartment, an arm pivotally mounted on said bracket, coacting means between said shaft and arm to cause rotation of said arm with said shaft, means for stopping said motor when the door is in its open position, said means including a treadle, a stop finger carried by said treadle for disposition in the path of said arm, said treadle being depressible to release said arm for rotation, a second treadle, said second treadle being mounted in the partition opening and an arm carried by said second treadle, said arm being positioned to arrest rotation of said shaft operated arm when the door is closed and movable by depression of said second treadle to permit opening of said door by the motor.

3. A trap of the class described including an elongated cage having a vertical transverse partition to form two compartments, said partition having an opening therethrough, one compartment having an open outer end, a swinging door for closing said open end, a spring motor mounted in said open ended compartment, connecting means between said motor and door to permit opening or closing of the door by the motor, a shaft projecting inwardly from said motor, a laterally extending stop finger on said shaft, a bracket rising from the floor of said compartment, an arm pivotally mounted on said bracket, a laterally extending stop finger formed on the pivotal end of said arm, adapted to coact with the stop finger on said shaft to permit rotation of said arm with said shaft, means for stopping said motor when the door is in open position, said means including a treadle, a stop finger carried by said treadle for disposition in the path of said arm, said treadle being depressible to release said arm for rotation, a second treadle, said second treadle being mounted in the partition opening, and an arm carried by said second treadle, said arm being positioned to arrest rotation of said shaft operated arm when the door is closed and movable by depression of said second treadle to permit opening of said door by the motor.

4. A trap of the class described including a substantially elongated cage having a vertical transverse partition to form two compartments, said partition having an opening therethrough, one compartment having an open end, a swinging door for closing said open end, a spring motor mounted in the open ended compartment, a shaft carried by said motor and extending laterally beyond the sides of said motor, one end of said shaft being bent laterally to form a crank arm, link connection between said crank arm and door, an arm operated by said shaft, means for stopping said motor when the door is in its open position, said means including a treadle, a stop finger carried by said treadle for disposition in the path of said arm, said treadle being depressible to release said arm for rotation, a second treadle, said second treadle being mounted in the partition opening and an arm carried by said second treadle, said arm being positioned to arrest rotation of said shaft operated arm when the door is closed and movable by depression of said second treadle to permit opening of said door by the motor.

5. A trap comprising a cage open at its forward end, a partition dividing said cage into forward and rear compartments, the partition having a passage opening for communication between the compartments, a wall carried by the partition and top of said cage and extending about the passage opening, a trap door pivoted in the space enclosed by said wall and having a weighted arm extending into the forward compartment, a pivoted door for the open end of the forward compartment, a rotatably mounted power shaft in the forward compartment and having a crank extension connected with said door, an abutment arm turning with said shaft and adapted to engage the weighted arm of said trap door when the trap door is in a normal position, and a pivotally mounted platform in the forward compartment having an arm constituting a weighted bait holding arm and a second arm constituting a latching arm for engaging the abutment arm when the platform is in a normal position.

In testimony whereof I have hereunto set my hand.

LORAN J. WILSON.